Dec. 29, 1953     K. B. TRACE     2,664,030
METHOD OF AND APPARATUS FOR GENERATING AND CUTTING GEARS
Filed Oct. 10, 1945     4 Sheets-Sheet 1
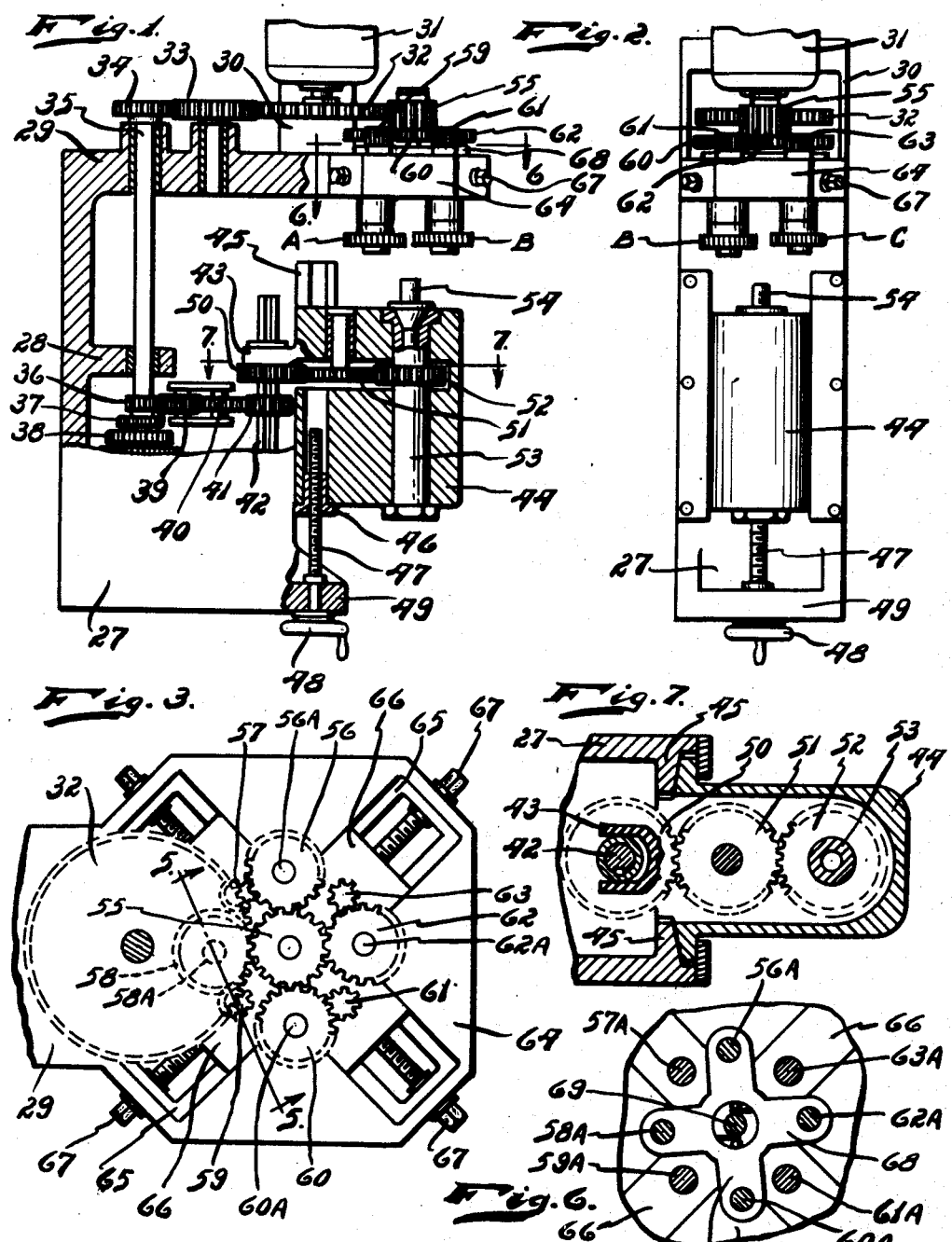
INVENTOR.
KEITH B. TRACE
BY
ATTORNEY Dec. 29, 1953 K. B. TRACE 2,664,030
METHOD OF AND APPARATUS FOR GENERATING AND CUTTING GEARS
Filed Oct. 10, 1945 4 Sheets-Sheet 2
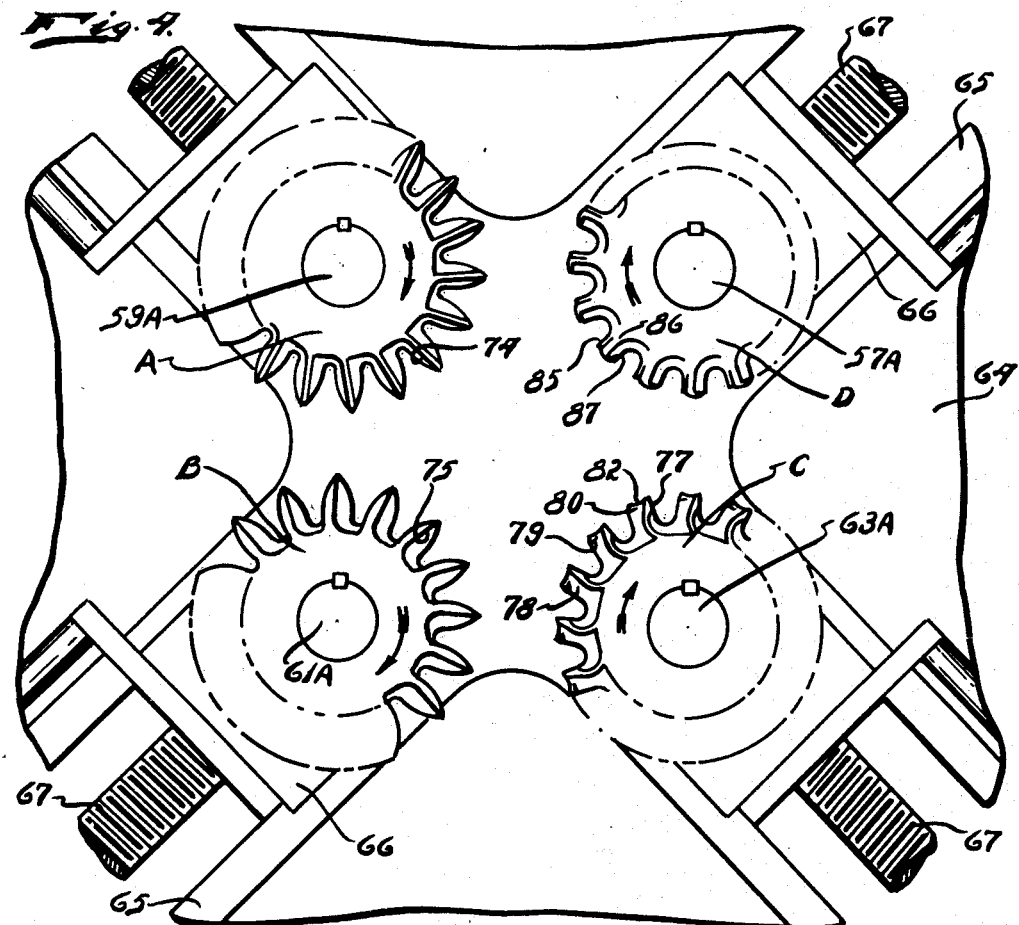
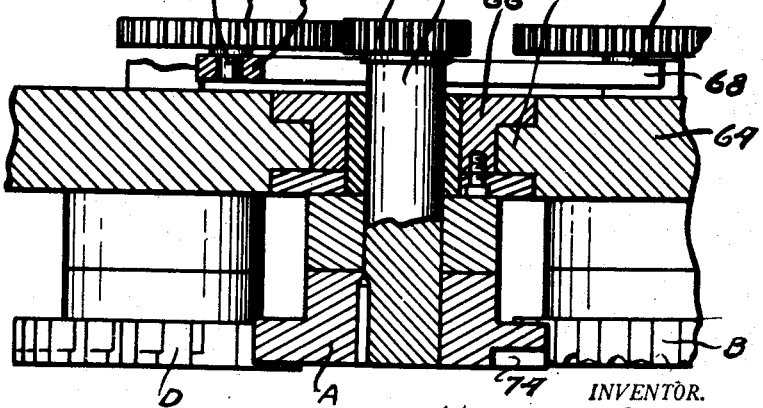
INVENTOR.
KEITH B. TRACE
BY
ATTORNEY

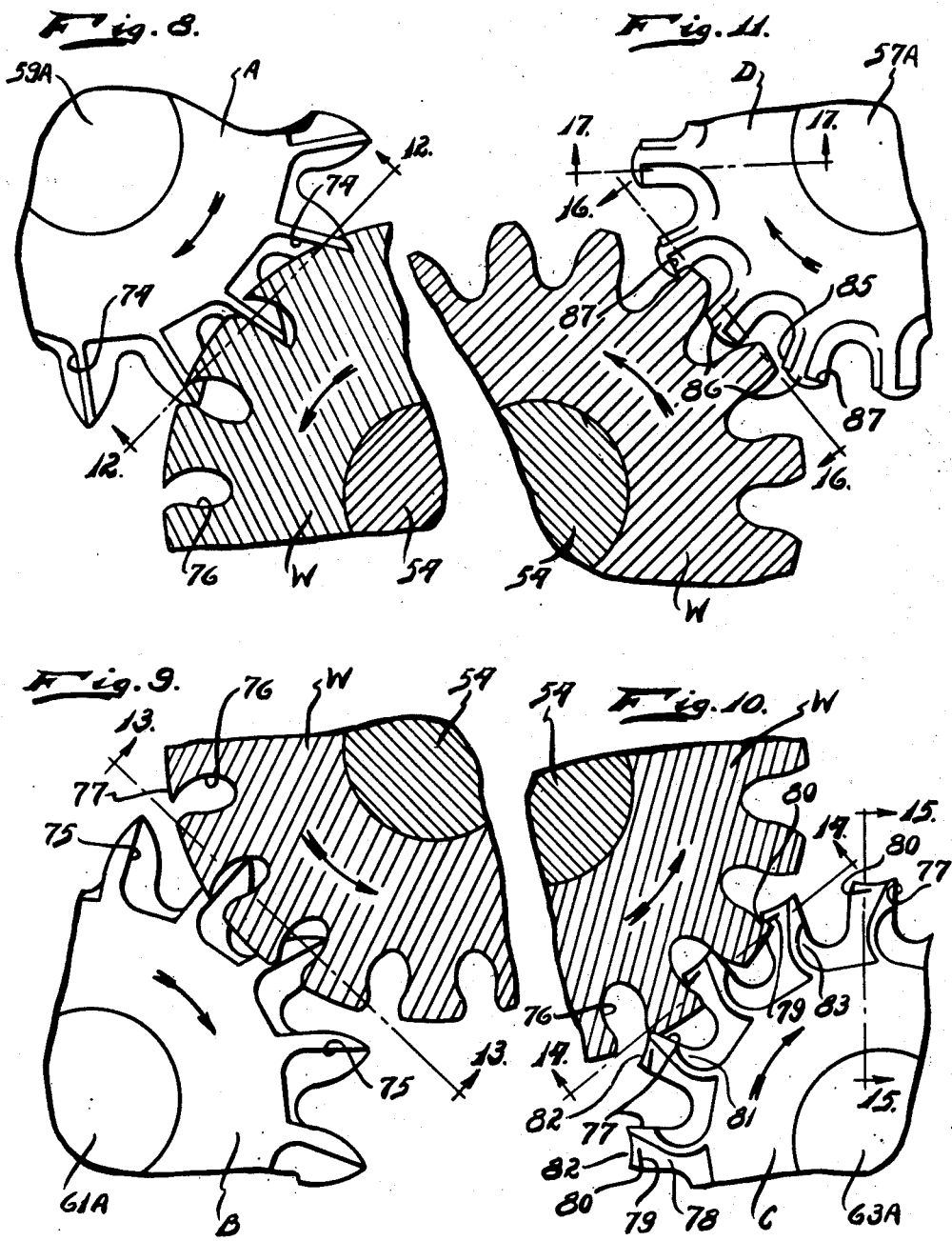

Dec. 29, 1953 K. B. TRACE 2,664,030
METHOD OF AND APPARATUS FOR GENERATING AND CUTTING GEARS
Filed Oct. 10, 1945 4 Sheets-Sheet 4
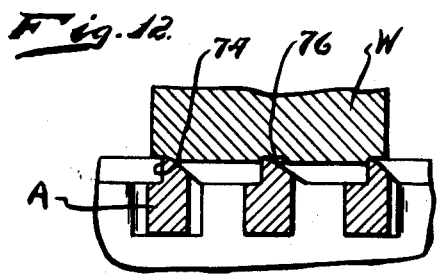
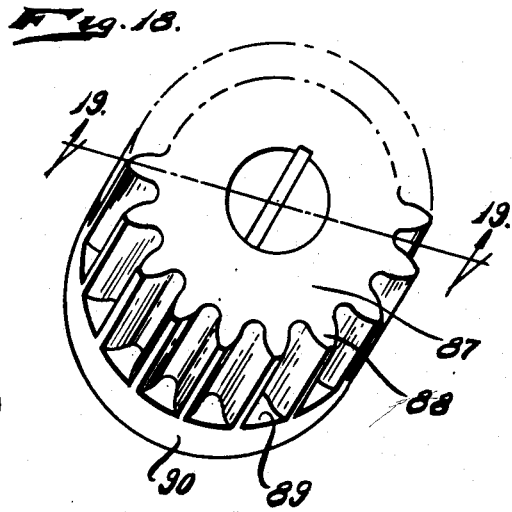
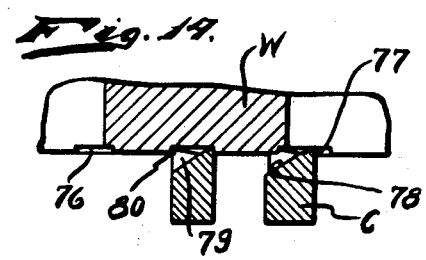
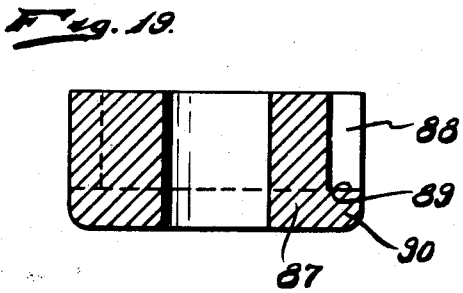
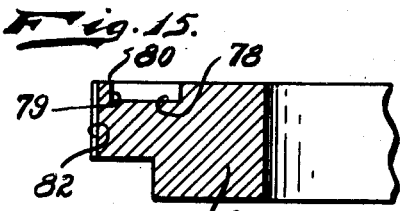
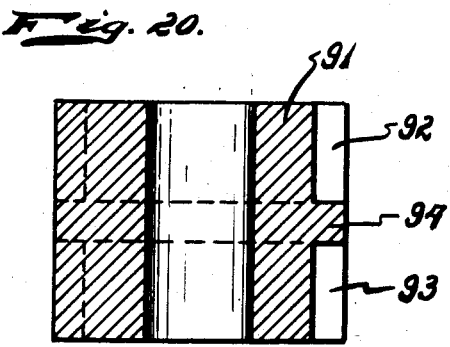
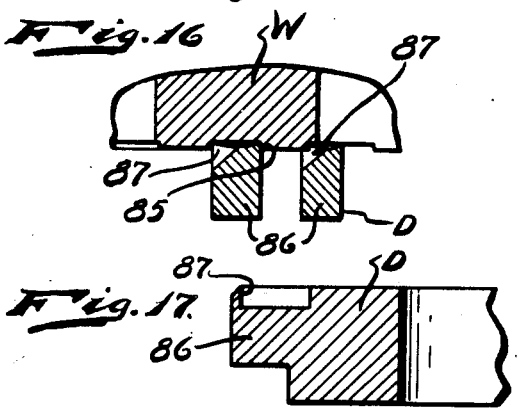
INVENTOR.
KEITH B. TRACE
BY
ATTORNEY

Patented Dec. 29, 1953

2,664,030

UNITED STATES PATENT OFFICE 2,664,030

METHOD OF AND APPARATUS FOR GENERATING AND CUTTING GEARS

Keith B. Trace, Detroit, Mich., assignor of one-half to Walter E. Pace

Application October 10, 1945, Serial No. 621,490

8 Claims. (Cl. 90—3)

My invention relates to a new and useful improvement in a method of and an apparatus for generating and cutting gears and similar articles with lobes or intermediate spaces including cutters adapted to be used for generating such articles.

It is an object of the present invention to provide a method of making gears and an apparatus for carrying out the method whereby the work-piece rotates on its own axis as it is being cut and the cutting members do not move out of contact with the work after beginning the cutting operation until the cutting operation is finished.

Another object of the invention is the provision of a method of and apparatus for cutting gears whereby gears of a truer pitch circle may be produced.

Another object of the invention is the provision of a method of cutting gears whereby the time required for cutting the gears is reduced considerably.

Another object of the invention is the provision of a method of cutting gears whereby indexing is eliminated, a steady constant feed is used and the feeding distance is only the distance across the face of the gear instead of around the circumference.

Another object of the invention is the provision of a method of cutting gears whereby the tooth of the gear is cut first on one side and then on the other.

Another object of the invention is the provision of a method of cutting gears whereby, instead of cutting metal from the work-piece by movement across the tooth of the gear the cutting is done in the same direction as the direction of travel of the tooth.

Another object of the invention is the provision of a method of cutting gears whereby a plurality of cutting elements are used cooperatively arranged and successively operating on the gear so that a portion of the tooth is cut by one element and another portion of the tooth is cut by another cutting element.

Other objects will appear hereinafter.

It is recognized that various modifications and changes may be made both in the method and in the apparatus for carrying out the method as illustrated herein and it is intended that such variations and modifications shall be embraced within the claims which form a part hereof.

Forming a part of the specification are drawings in which,

Fig. 1 is a central vertical sectional view of the machine used for carrying out the method showing parts broken away and parts in side elevation, Fig. 2 is a front elevational view of the machine used, Fig. 3 is a top plan view in fragment, Fig. 4 is an enlarged fragmentary elevational view showing the arrangement of the cutting elements, Fig. 5 is an enlarged sectional view taken on line 5—5 of Fig. 3, Fig. 6 is a fragmentary sectional view taken on line 6—6 of Fig. 1, Fig. 7 is a fragmentary slightly enlarged sectional view taken on line 7—7 of Fig. 1, Fig. 8 is a fragmentary elevational view showing the first step in the cutting operation, Fig. 9 is a fragmentary elevational view showing the second step in the cutting operation, Fig. 10 is a fragmentary elevational view showing the third step in the cutting operation, Fig. 11 is a fragmentary view showing the fourth step in the cutting operation, Fig. 12 is a sectional view taken on line 12—12 of Fig. 8, Fig. 13 is a sectional view taken on line 13—13 of Fig. 9, Fig. 14 is a sectional view taken on line 14—14 of Fig. 10, Fig. 15 is a sectional view taken on line 15—15 of Fig. 10, Fig. 16 is a sectional view taken on line 16—16 of Fig. 11, Fig. 17 is a sectional view taken on line 17—17 of Fig. 11, Fig. 18 is a perspective view of a gear cut by the method herein described, Fig. 19 is a sectional view taken on line 19—19 of Fig. 18, Fig. 20 is a sectional view similar to Fig. 19 showing a modification.

In the drawings I have illustrated as an example a machine which is capable of performing the operation so that the gears are cut according to the method referred to herein. In this machine I have illustrated a body 27 having the bearing 28 projecting inwardly from one portion thereof and provided with the overlying supporting portion 29. Projecting upwardly from this portion 29 is a standard 30 which serves as the support for the electric motor 31 which serves to drive the pinion 32. This pinion is in mesh with the idler 33 which in turn meshes with the gear 34 fixedly mounted upon the shaft 35. Fixedly mounted on this shaft 35 is a plurality of gears 36, 37 and 38 so that the speed of rotation of the driven parts may be controlled. The transmission in itself forms no part of the present invention and is not illustrated in detail. Meshing with the gear 36 is an idler 39 with which meshes an idler 40 which in turn meshes with the gear 41 slidably mounted on the shaft 42 and adapted for rotating in unison therewith. The yoke 43 projects outwardly from the slidable support 44 which is slidably mounted on the standards or guide rails 45 which project upwardly from the body 27. Secured to this body 44 is a nut 46 in which is threaded a screw 47 which projects through and is adapted to rotate relatively to the lug 49 projecting outwardly from the body 27. The screw 47 is provided with a hand wheel 48 whereby it may be rotated and as illustrated in Fig. 1 this screw 47 is fixed axially relatively to the lug 49. Slidably mounted on the shaft 42 and rotating in unison therewith is the gear 50, the yoke 43 carrying the gear 50 longitudinally of the shaft 42 when the screw 47 is rotated to move the supporting head 44. This gear meshes with the idler gear 51 which in turn meshes with the gear 52 fixedly mounted on the shaft 53. This shaft 53 carries a suitable column 54 on which the work-piece is positioned so that when the shaft 53 is rotated the work-piece retained by the column is also rotated.

The gear 32 meshes with the gear 55. Meshing with the gear 55 is the idler gear 56 which also meshes with the gear 57 the gear 56 being mounted on the shaft 56A and the gear 57 being mounted on the shaft 57A shown in Fig. 6. The gear 55 also meshes with the gear 58 mounted on the shaft 58A and this gear 58 meshes with the cutter gear 59 mounted on the shaft 59A. The gear 55 meshes with the gear 60 mounted on the shaft 60A and this gear 60 in turn meshes with the gear 61 fixedly mounted on the shaft 61A. The gear 55 meshes with the gear 62 mounted on the shaft 62A and the gear 62 meshes with the gear 63 which is fixedly mounted on the shaft 63A. Supported by the portion 29 is the head 64 on which is mounted the plurality of slides one of these slides being provided for each of the shafts 57A, 59A, 61A and 63A. They are similarly constructed and operate similarly so that a description of one will suffice as a description for all. Slidably mounted on the slide is a carriage 66 in which the shaft 63A is journaled. Connected to the carriage 66 is a screw 67 so that upon a rotating of the screw 67 the carriage 66 may be moved inwardly and outwardly on the slide 65. This is to provide means for adjusting the apparatus to cut gears of different sizes. Each of the shafts 56A, 58A, 60A and 62A projects through one of the radiating arms 68 which may be keyed to the shaft 69 at various positions of rotation so that when the shafts 63A, 57A, etc., are moved outwardly the gears 56, 58, 60 and 62 will be swung on the shaft 69 as an axis so that they remain in mesh with the gears 63, 61, 59 or 57 as the case may be. Thus it becomes possible to space the shafts 57A, 59A, 61A and 63A farther apart and yet maintain the necessary meshing of the gears for driving these shafts. Mounted on the lower end and rotated by each of the shafts 57A, 59A, 61A and 63A is a cutter, cutter A, cutter B, cutter C, and cutter D being designated in the order of their operation so that cutter A may be said to be cutter No. 1, cutter B cutter No. 2, cutter C cutter No. 3, and cutter D cutter No. 4. In Figs. 8, 9, 10 and 11 I have designated the work-piece or blank from which the gear is to be cut by the numeral W. The teeth of the various cutters are differently formed to perform their different operations and a description of the cutting operation will now proceed.

The teeth on the cutter A are cutaway as at 74 on the advancing edge or face. The outer edge of this cut away portion effects the cutting. While the teeth are located diametrically opposite each other the cutting face or the face 74 on which the cutting edge is present does not extend diametrically but is inclined at an angle as clearly appears in Fig. 8. When the workpiece is positioned on the retainer 54 the support 44 may be moved upwardly so as to move the work-piece into engagement with the cutters positioned above as the face of the work-piece is engaged by the cutters the operation is as shown in Fig. 8, Fig. 9, Fig. 10, and Fig. 11. As the teeth of the cutter A enter the work-piece a recess is formed in the advancing face of the work-piece the formation of these recesses being clearly shown in Fig. 8. It will be noted that the cutting is a continuous one and that the advancing edge is cutting the material directly ahead of it. Cutter A is of course rotating in the direction indicated by the arrow and the work-piece W is rotating continuously in the direction indicated by the arrow on it. Cutter No. 1 is positioned approximately five thousandths of an inch ahead of cutter No. 2 or cutter A is five thousandths of an inch ahead of cutter B and cutter B is five thousandths of an inch ahead of cutter C. Cutter A is used to cut the depth and cutter B is used to cut to the proper width.

The teeth on cutter B are cut away as at 75 to provide an advancing face and the edge of this advancing face is the portion which does the cutting. As the tooth of cutter B enters the recess 76 formed by cutter A the tooth of cutter B removes a portion of the tip 77 and also widens the recess 76 so as to cut to the proper width.

The teeth on cutter C have a cutting edge which is the edge of the face 77. These teeth are also cut away as at 78 to provide the under-cut surface 79 the edge 80 of which (see Fig. 15) is a cutting edge. Cutter No. 3 takes off more of the material and rough-cuts the involutes. As shown in Fig. 10 as the tooth enters the recess 76 the edge of the face 77 effects a cutting operation and as tooth 81 moves into the position shown in Fig. 10 the edge of the face 77 effects a cutting. As this movement continues the edge of the face 82 will also effect a cutting operation. This is the second cutting position. When tooth 83 reaches the position shown in Fig. 10 the edge of the face 79 will effect a cutting operation as clearly appears in Fig. 10. This is the third cutting position of this tooth. This cutting element thus rough-cuts the involutes and has three definite positions of cutting.

In cutter D the edge of the face 85 of the tooth 86 will effect a cutting of the face opposed to it and as the movement continues the cutting edge 87 will effect a cutting. Consequently, the teeth on cutter D have two cutting positions as it enters the tooth and as it leaves it. Cutter D moves in and finishes the involute to size, the involute having been rough-cut by cutter C.

It will be noted that all of the cutters are constantly rotating and that the work-piece is constantly rotating and also that the cutters are constantly in contact with the work-piece. There is no movement inwardly and outwardly from the work-piece in order to effect the cutting. Moreover, it will be noted that the cutters are moved axially and travel merely the length of the teeth.

This makes it possible to cut a gear which is concentric with its bore inasmuch as the work-piece rotates on its own axis as it is being cut. It will also be noted that there is no indexing and that there is a constant feed of the work-piece into the cutting members. Experience has shown that this method of cutting a gear is one which renders the gear truer to size and concentric while at the same time the gear cutting may be easily and quickly effected reducing the labor cost considerably.

In Fig. 18 I have illustrated a type of gear which it is possible to cut by this method. It is recognized that the various types of gears may be cut by the method but in Fig. 18 I have illustrated a gear 87 having the teeth 88 which terminate with a flat wall 89 on the flange 90 so that it thus becomes possible to cut the gears against a flat face. In Fig. 20 I have illustrated a similar construction in which the gear 91 is provided with the teeth 92 and 93 at opposite sides of the flange 94 this flange having flat faces. At the present time there is no known method whereby gears may be cut so as to provide the flat faces on the flanges 90 or 94.

In the claims when the expression "solid blank" is used this term is used to indicate the blank from which the gear is made but the blank will of course have the central opening there through for receiving the column 54 on which the work piece is mounted. The term "solid blank" indicates that the work piece has had no operations performed thereon directed to the formation of teeth thereon. It is believed obvious that while I have illustrated a mechanism for cutting the gears in which the four cutters are mounted on a single machine that the method of using the successive cutters for cutting successive parts of the tooth need not require a machine such as illustrated and that the method may be followed and carried out with other types of construction.

What I claim as new is:

1. A gear cutting cutter for cutting gears on a rotating blank comprising: a body provided with cutters with cutting edges on the face of the cutters for cutting a cavity in the blank, one cutting edge facing outwardly from the axis of rotation of the body for cutting one involute and the other cutting edge facing inwardly toward the axis of rotation of the body for cutting another involute.

2. A cutter of the class described comprising a body; a cutter on said body with the cutting edge on the face thereof for cutting a cavity, the cutting edge facing inwardly toward the axis of rotation of the body for cutting an involute.

3. A cutter of the class described, comprising: a body; a cutter on said body having a cut-away portion on its face inwardly of its periphery providing an undercut surface having a cutting edge at its outer end, the cutting edge facing inwardly toward the axis of the body.

4. A cutter of the class described, comprising: a body; a cutter on said body having a cut-away portion on its face inwardly of its periphery providing an undercut surface having a cutting edge at its outer end, the cutting edge facing inwardly toward the axis of the body, said cutter having another cutting edge facing outwardly from the axis of the body.

5. The method of cutting from a solid cylindrical blank a cylindrical gear of the spur or helical type in which the tooth spaces run generally longitudinal and out of one end of the cylinder comprising rotating the blank on its axis and starting the cutting action at said end by rotating a toothed face cutter on an axis substantially parallel to said blank axis, and in a direction opposite to the direction of rotation of the blank with the axes of the blank and the cutter so spaced that the teeth of the cutter will mesh with the blank to the desired depth of the tooth space, the teeth of the cutter lying in a plane generally transverse to the axis of the blank and the cutter edges of the teeth of the cutter so related that each tooth of the cutter, upon engagement with the blank, will cut from the solid blank a tooth space to the desired depth and of an incremental extent longitudinally of the blank and continuing said rotation of the blank and cutter with incremental relative feed of the cutter and blank longitudinally of the blank to continue to cut tooth spaces to the desired depth and of incremental longitudinal extent until the tooth space is cut to the desired length.

6. The method of cutting from a solid cylindrical blank a cylindrical gear of the spur or helical type in which a tooth space runs generally longitudinally and out of one end of the cylinder, comprising starting at the said end of the blank and cutting from the side of the solid blank into the desired depth of the tooth space and out to remove a lamina of material equal to the cross section of the desired tooth space and of an incremental thickness and continuing such cutting action in step by step increments until the tooth space is cut to the desired length.

7. A rotary gear cutting cutter adapted for cutting teeth on a rotating blank comprising a toothed body having the end faces of the teeth lying in the same plane, the teeth forming spaced apart cutters for operating upon the blank with cutting edges on the face of the cutters for cutting a cavity, one cutting edge facing outwardly from the axis of rotation for cutting one involute and the other cutting edge facing inwardly toward the axis of rotation for cutting an opposite involute.

8. A gear cutting cutter for cutting gears on a rotating blank comprising: a body provided with cutters with cutting edges on the face of the cutters for cutting a cavity in the blank, one cutting edge facing outwardly from the axis of rotation of the body for cutting one involute and the other cutting edge facing inwardly toward the axis of rotation of the body for cutting another involute.

KEITH B. TRACE.

References Cited in the file of this patent

UNITED STATES PATENTS

| Number | Name | Date |
| --- | --- | --- |
| 616,648 | Beale | Dec. 27, 1898 |
| 618,978 | Beale | Feb. 7, 1899 |
| 1,168,402 | Lees | Jan. 18, 1916 |
| 1,175,066 | Lees | Mar. 14, 1916 |
| 1,267,970 | Burgess | May 28, 1918 |
| 1,329,805 | Schurr | Feb. 3, 1920 |
| 1,642,179 | Schurr | Sept. 13, 1927 |
| 1,724,168 | Barnes | Aug. 13, 1929 |
| 2,126,178 | Drummond | Aug. 9, 1938 |
| 2,206,450 | Christman | July 2, 1940 |